Figure 1:
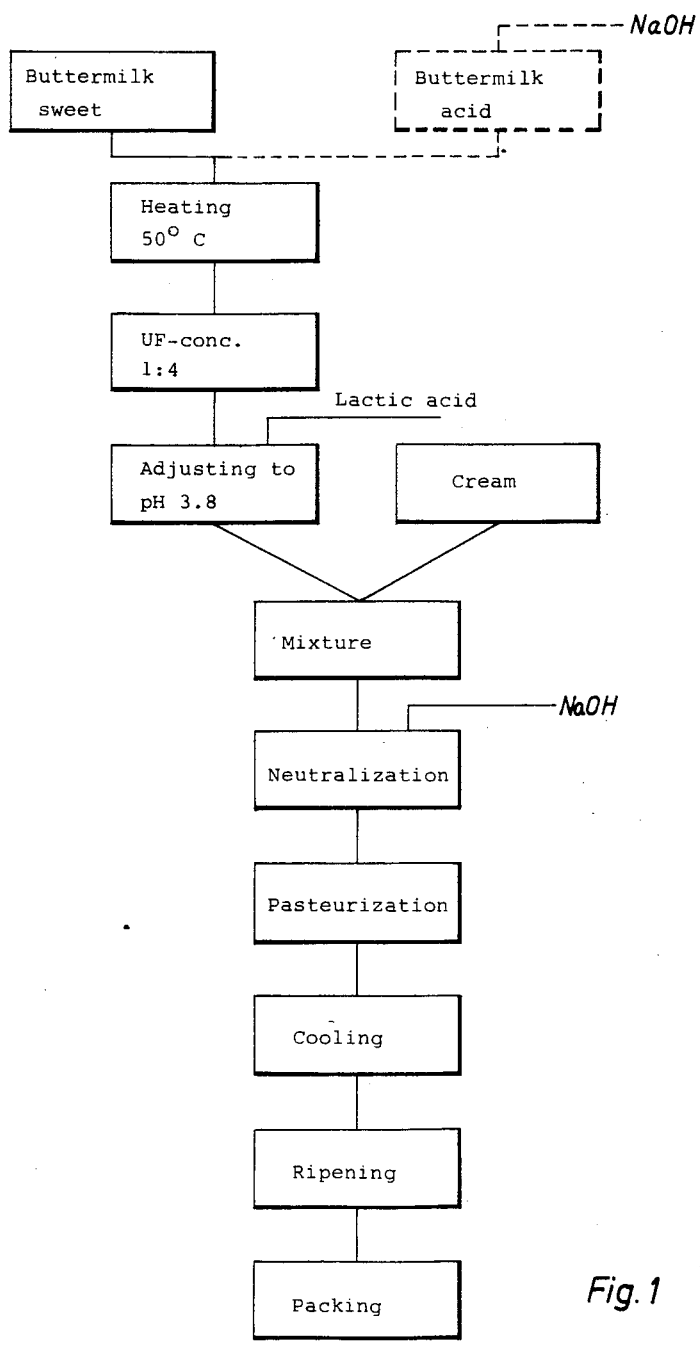

United States Patent [19]

Andersson et al.

[11] Patent Number: 4,556,574
[45] Date of Patent: Dec. 3, 1985

[54] METHOD OF IMPROVING THE WHIPPING PROPERTIES OF CREAM

[75] Inventors: Kenneth Andersson, S. Sandby; Per Pihl, Lund, both of Sweden

[73] Assignee: Alfa-Laval AB, Tumba, Sweden

[21] Appl. No.: 552,128

[22] PCT Filed: Mar. 30, 1983

[86] PCT No.: PCT/SE83/00121
§ 371 Date: Nov. 1, 1983
§ 102(e) Date: Nov. 1, 1983

[87] PCT Pub. No.: WO83/03337
PCT Pub. Date: Oct. 13, 1983

[30] Foreign Application Priority Data

Apr. 1, 1982 [SE] Sweden ............................... 8202102

[51] Int. Cl.⁴ ............................................. A23C 13/00
[52] U.S. Cl. .................................... 426/570; 426/491; 426/492; 426/586
[58] Field of Search ............... 426/586, 583, 491, 492, 426/580, 570, 613

[56] References Cited

U.S. PATENT DOCUMENTS

| | | | |
|---|---|---|---|
| 2,414,837 | 1/1947 | Riggs | 426/586 |
| 3,468,671 | 9/1969 | Bratland | 426/570 |
| 3,505,077 | 4/1970 | Bratland | 426/491 |
| 4,205,090 | 5/1980 | Maubois et al. | 426/491 |

FOREIGN PATENT DOCUMENTS

| | | | |
|---|---|---|---|
| 6601512 | 2/1966 | Netherlands | 426/586 |
| 0118019 | 6/1965 | Norway | |
| 362343 | 10/1973 | Sweden | |
| 391633 | 2/1977 | Sweden | |

OTHER PUBLICATIONS

Account from Statens Forsogsmejeri, Hillerod, Denmark: Report 242, pp. 33-35.

*Primary Examiner*—Raymond Jones
*Assistant Examiner*—Marianne M. Cintins
*Attorney, Agent, or Firm*—Cyrus S. Hapgood

[57] ABSTRACT

A method for improving the whipping properties of cream by the addition of a fraction of buttermilk to the cream is disclosed. A concentrate is produced by ultrafiltration of buttermilk, which concentrate is made acid to a pH lower than 4.0, preferably 3.8. This concentrate is mixed with cream with a desired fat content in an amount of 5-15%. The obtained mixture is neutralized and thereafter treated in a desired manner.

8 Claims, 3 Drawing Figures

METHOD OF IMPROVING THE WHIPPING PROPERTIES OF CREAM

The present invention relates to a method of improving the whipping properties of cream by adding a fraction of buttermilk to the cream.

The processes run in parallel when cream is whipped. The first one consists of beating air into the cream with a gradual atomizing of the air into smaller and smaller bubbles. The second one is that fat globules in the cream stick together to form aggregates with increasing size.

During the whipping a two phase system is formed, in which air is the disperse phase and cream the continuous phase. In the continuous phase the fat globules are packed such that they form a supporting skeleton. If the supporting skeleton shall form there is needed
 a. that the fat is crystallized
 b. that aggregate forming agents are available.

The skeleton must be rigid and kept together of aggregate forming substances. These substances are found in the membranes of the fat globules. The membranes consist of two different types of lipoprotein complex with different solubility in water. The inner layer of the membranes consists of the lipides which have the least polar properties. The outer layer consists of phospholipides with hydrophile groups to which further proteins are bound. These aggregates of phospholipides and proteins are key components in order to obtain a sufficient aggregate state of the fat globules.

The possibility to whip cream diminishes at a lower fat content. In order to obtain a stable foam a fat content of 35–40% fat is needed. At a lower fat content there is not a sufficient amount of the aggregate forming substances mentioned above. If one wants to produce cream which may be whipped with a lower fat content, aggregate forming substances, for example monoglycerides, must be added. Such substances may however change the taste of the cream.

One has earlier tried to obtain naturally occuring aggregate forming components from milk, which components have been mixed with cream with a low fat content. Such a procedure is described in the Norwegian patent publication No. 118 019. According to the patent publication cream with a fat content over 30 percent by weight is mixed with buttermilk in such a relation that a cream with a fat content of 17–28% is obtained. According to the patent publication it is possible to whip this cream. A mixture with a corresponding amount of skimmilk gives a cream, which is impossible to whip. The reason for this should be that while skimmilk has a content of phospholipides of 0.01–0.02%, buttermilk with the same fat content contains 10 times more phospholipides.

In the Swedish patent publication No. 391 633 there is described another way of obtaining a cream, which is whippable with a low fat content. In this case one starts with cream having a fat content of at least 30 percent by weight from which there is separated a fat rich fraction with a fat content of over 90 percent by weight. The fraction rich in fat is separated in such a degree that the remaining water containing fraction consists of a cream, which is whippable. Separation takes place in a homogenizer. According to the patent publication the fact that the cream is whippable depends on a complex compound of phospholipides and proteins, which complex easily breakes down. When carrying through a total phase change and separation of clean butteroil the complex compound will still be left in the water containing fraction.

The Swedish patent publication No. 362 343 describes another method of producing whippable cream. According to this method a fraction containing membrane substance is added to cream, which fraction has been obtained by melting butter, which has then been centrifuged. Cream with a fat content of at least 30 percent by weight is mixed with the obtained fraction containing membrane substance, which has a low fat content to yield a mixture with a fat content of 20–25 percent by weight of the mixture. Butter oil is obtained as a by-product.

The patents which have been mentioned above were applied for in the middle and end of the sixties, but the methods, which have been described have not been used industrially. With the described method, problems have arisen to obtain a whippable cream with a stable foam. No whippable cream with a low fat content is found on the market today, where the whipping properties have been increased by means of a buttermilk fraction.

In a report 242 Account from Statens Forsogsmejeri, Hillerod, Denmark "The emulsion stability of whipping cream" the alleged positive effect of an addition of sweet buttermilk on the whipping properties of the cream is questioned, since no amendment of the whipping properties of the cream have been obtained by adding a concentrate of buttermilk obtained by ultrafiltration.

According to the invention a method has been found to obtain a concentrate from buttermilk, which mixed with cream surprisingly gives a stable foam. According to the proposed method buttermilk is concentrated by ultrafiltration. The obtained concentrate is made acid to a pH lower than 4.0, preferably 3.8. The obtained acid concentrate is mixed with cream with desired fat content. The amount of buttermilk concentrate consists of 5–15% of the amount of cream. The mixture is neutralized and the cream is treated further in the desired manner. An addition of the acid concentrate amends the whipping properties of the cream, while concentrate, which has not been made acid, has no effect at all.

The ultrafiltration is preferably carried through after heating the buttermilk to a temperature within the interval 40°–75° C., preferably around 50° C. The starting material is sweet buttermilk or neutralized acid buttermilk. Reconstituted buttermilk made from buttermilk powder may also be used. The buttermilk is concentrated by ultrafiltration in a relation 1:4. The obtained buttermilk concentrate is preferably made acid with lactic acid, which means that only naturally occuring milk substances are used for the acidification. Of course, it is possible to use any acid, which is allowed as a food additive. The fat content of the cream is standardized by mixing the cream with skimmilk or lightmilk. The ultrafiltrate which has been adjusted to its pH is added in an amount of 5–15% counted on the cream, which is thereafter neutralized to pH 6.5 with diluted NaOH. The cream, which has been produced in the manner described above, the whipping properties of which have been amended, may thereafter be pasteurized and sterilized.

In the usual case one starts with cream with a fat content of 40% which is given the desired fat content by mixing with milk, but of course it is also possible to produce cream with the desired fat content directly. The method according to the invention may with advantage be used to produce whippable cream with as low a fat content as 22–26%.

The mechanisms which lie behind the invention are described further below. During the ultrafiltration the buttermilk is concentrated.

| Analysis | Buttermilk | Concentrate | Permeat |
| --- | --- | --- | --- |
| Dry substance | 8.5 | 18.0 | 4.5 |
| Phospholipide % | 0.10 | 0.44 | 0.00 |

According to the analysis all phospholipide is obtained in the concentrate.

If UF-concentrated buttermilk is added to cream there is obtained no amendment of the whippability, which may be seen in the table.

TABLE

Whipping of cream with a fat content of 22.5% after addition of different amounts of concentrate. Whipping temperature +5° C.

| Sample No | Added amount of concentrate (%) | Hardness | Whipping time (sec) | Increase in volume (%) | Separation of serum (ml) |
| --- | --- | --- | --- | --- | --- |
| 1 | 0 | 10 | 385 | 102 | 23 |
| 2 | 3 | 10 | 373 | 98 | 22 |
| 3 | 6 | 8 | 388 | 92 | 23 |
| 4 | 9 | 6 | 380 | 90 | 23 |

An addition of buttermilk concentrate results in an impairment of the properties of the cream at this low fat content. This negative result probably depends on the fact that the active complex between phospholipide and proteins is dissolved.

According to the present invention a method has been found to reform the complex in the UF-concentrated buttermilk by making the concentrate acid before it is added to the cream. The positive effect is retained also after the following neutralization of the cream.

Figure 2:
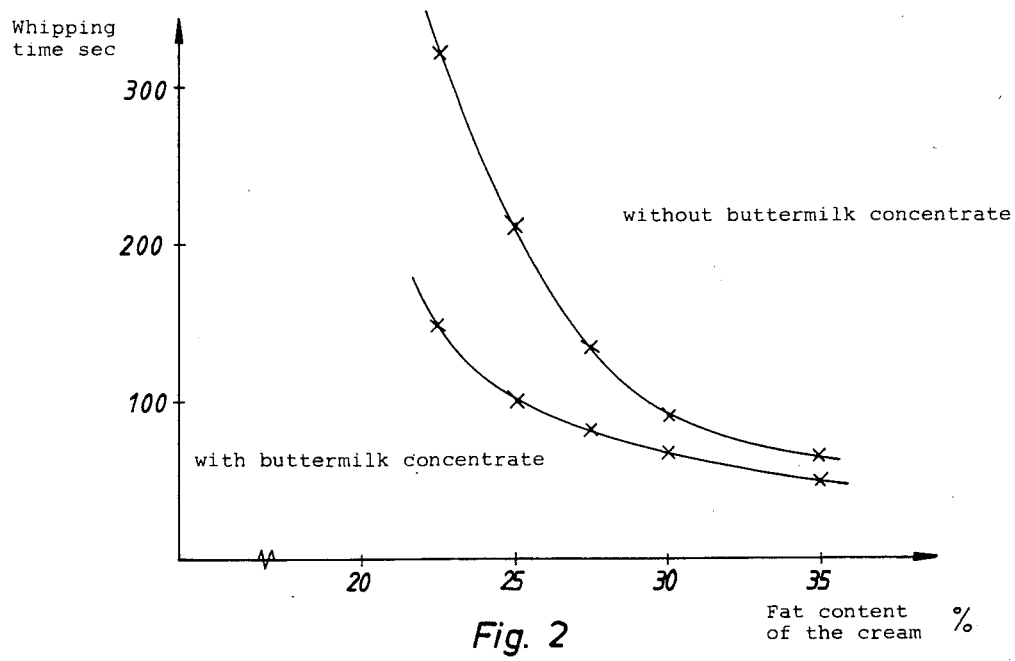
Figure 3:
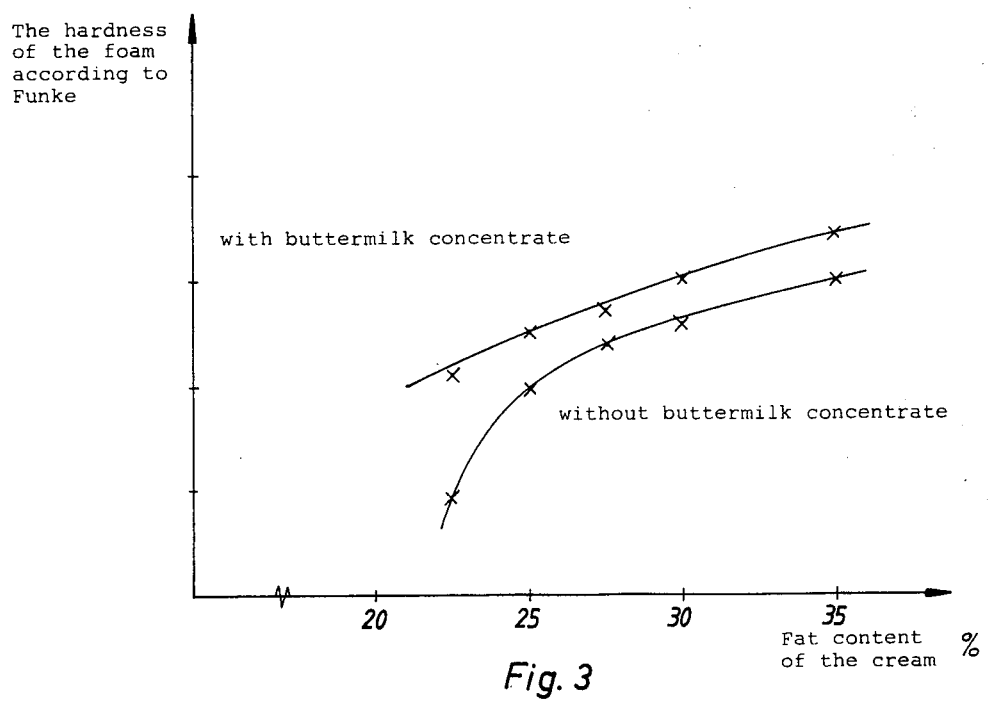

The invention is described further with reference to the attached drawings, where FIG. 1 shows a flowchart over the production of light cream, which is whippable according to the invention and FIGS. 2 and 3 show diagrams over experiments with whipping according to Funke with or without addition of UF-concentrate.

In FIG. 1 there is shown the steps, which are needed for the production of cream. Sweet or neutralized buttermilk is thus heated to 50° C. and is ultrafiltrated in a relation 1:4. The obtained concentrate is made acid with lactic acid to a pH lower than 4.0. Cream is standardized with skimmilk and is then mixed with concentrate to the desired fat content. The amount of concentrate is 5–15% of the cream. The mixture is thereafter neutralized with NaOH to p H 6.5. The cream is pasteurized, cooled, let to ripen and is packed. The whipping cream according to the invention retains its good whipping qualities in spite of pasteurizing or sterilizing.

In FIG. 2 there is shown a diagram over the whipping time of cream samples with different fat contents, one graph with cream samples containing 5% buttermilk concentrate according to the invention and one with cream samples without this addition. As may be seen from the diagram the whipping time is lowered in a considerable degree by addition of acid concentrate, at which the difference is the greatest at low fat contents.

In FIG. 3 there is shown a diagram over the hardness of the foam according to Funke for cream samples containing 5% buttermilk concentrate according to the invention and for cream samples without this addition. As may be seen from the diagram cream foams obtained according to the invention are considerably more stable than cream foams without this addition.

As may be seen from the diagrams the addition of acid concentrate, has a positive effect at fat contents within the interval 22–35%, but the effect is more marked for creams with a low fat content. It is consequently possible to obtain a whippable cream having low fat content according to the invention Also from a manufacturing point of view the proposed invention is beneficial. The acidified buttermilk concentrate has extraordinary keeping qualities and may be transported from butterdairies to dairies, which produce cream, without a diminishing of the quality.

The given limits for the addition of buttermilk concentrate is determined by a lower value, under which no positive effect on the whipping is obtained and an upper value, above which an effect on the taste of the cream sets in, which the consumers may react to.

We claim:

1. A process for the production of cream having improved whipping properties, which comprises concentrating buttermilk by ultrafiltration, then acidifying the concentrated buttermilk to a pH below 4.0, adding the acidified buttermilk concentrate to cream having a predetermined fat content, the amount of said added concentrate being in the range of 5–15% of the amount of the cream, and neutralizing the mixture of buttermilk concentrate and cream.

2. Method according to claim 1, in which the ultrafiltration is carried through at a temperature within the interval 40°–75° C.

3. Method according to claim 1, in which the pH of the buttermilk is neutral during the ultrafiltration.

4. Method according to claim 1, in which the buttermilk is concentrated by ultrafiltration to one part of concentrate from four parts of unconcentrated buttermilk.

5. Method according to claim 1, in which the obtained buttermilk concentrate is made acid with lactic acid.

6. Method according to claim 1, in which the concentrate which has been made acid is mixed with cream having a fat content of 22–26%, at which a whippable cream with low fat content is obtained.

7. The method of claim 1, in which the concentrated buttermilk is acidified to a pH below 3.8.

8. Method according to claim 2, in which said temperature is about 50° C.

* * * * *